United States Patent [19]

Sulej

[11] Patent Number: 4,620,352

[45] Date of Patent: Nov. 4, 1986

[54] SHOP PRESS

[76] Inventor: John Sulej, 19335 Oak Ave., Country Club Hills, Ill. 60477

[21] Appl. No.: 831,052

[22] Filed: Feb. 18, 1986

Related U.S. Application Data

[63] Continuation of Ser. No. 572,197, Jan. 19, 1984, abandoned.

[51] Int. Cl.$^4$ .............................................. B23P 19/04

[52] U.S. Cl. ...................................... 29/251; 100/257; 188/82.84

[58] Field of Search .......................... 29/251; 100/257; 188/82.84

[56] References Cited

U.S. PATENT DOCUMENTS

| | | | |
|---|---|---|---|
| 1,280,296 | 10/1918 | Pruyn | 29/251 |
| 1,645,554 | 10/1927 | Taylor | 188/82.84 X |
| 1,758,451 | 5/1930 | Manley | 100/257 X |
| 3,168,034 | 2/1965 | McClocklin et al. | 100/257 X |
| 3,201,967 | 8/1965 | Balamouth | 100/257 X |
| 3,495,527 | 2/1970 | Lafreniere | 100/257 X |

*Primary Examiner*—Frederick R. Schmidt
*Assistant Examiner*—Steven P. Schad
*Attorney, Agent, or Firm*—Trexler, Bushnell & Wolters, Ltd.

[57] ABSTRACT

A shop press that includes a fixed-height table capable of supporting a workpiece. A ram assembly is mounted for vertical movement over the table. The ram assembly carries a fluid power head, and is arranged to permit the head to be moved horizontally so as to position the head at any desired location relative to the device table and a workpiece carried thereon. A system for vertically moving the ram assembly includes a cable arrangement connected between dual drums on the table and pulleys journaled on ram assembly legs. As the cable is wound upon or let off the drums, the ram assembly is moved upwardly or downwardly. A slip clutch and brake assembly permits the ram assembly to be moved upwardly without the interference of frictional force, but a frictional drag brake action is applied as the ram is moved downwardly to control such downward movement.

8 Claims, 6 Drawing Figures

SHOP PRESS

This application is a continuation of application Ser. No. 572,197, filed Jan. 19, 1984, now abandoned.

BACKGROUND OF THE INVENTION

This invention relates generally to shop presses, and more particularly concerns a shop press having a movable ram or head.

Shop presses are commonly used for a wide variety of tasks in tool companies, factories and repair shops. In these and other facilities, shop presses are used to perform part-installation and part-removal tasks involving piston pins, motor armatures, brake drum studs, and the like. Such parts are typically press-fit into larger assemblies. A properly designed, sized, and correctly operated shop brake makes it easy to remove or install such parts in their assemblies.

Usually a shop press is provided with a table-like bolster for supporting a workpiece. The bolster is normally adjustable: that is, the bolster can be moved up or down so as to locate the bolster and a carried workpiece appropriately near a head of the shop press. This head has a fluid power cylinder or other device designed to engage the workpiece on the bolster. Often these bolsters are relatively thin or narrow, and provide but limited workpiece-accommodating surfaces. One such shop press is shown in U.S. Pat. No. 4,169,412.

Applicant has found it desirable for a shop press to have an enlarged polygonal, relatively wide workpiece-accommodating table, which can more completely and securely support the workpiece. A work table permanently located at a convenient working height is also desirable. Nevertheless, it is important that the space between the machine head and work table be adjustable, so as to permit that head to be properly positioned relative to the workpiece and table. Adjustment of the head in a horizontal direction is also beneficial.

It is the purpose of this invention to provide a shop press having the above advantages and features. Other advantages of the invention will become apparent upon reading the following description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
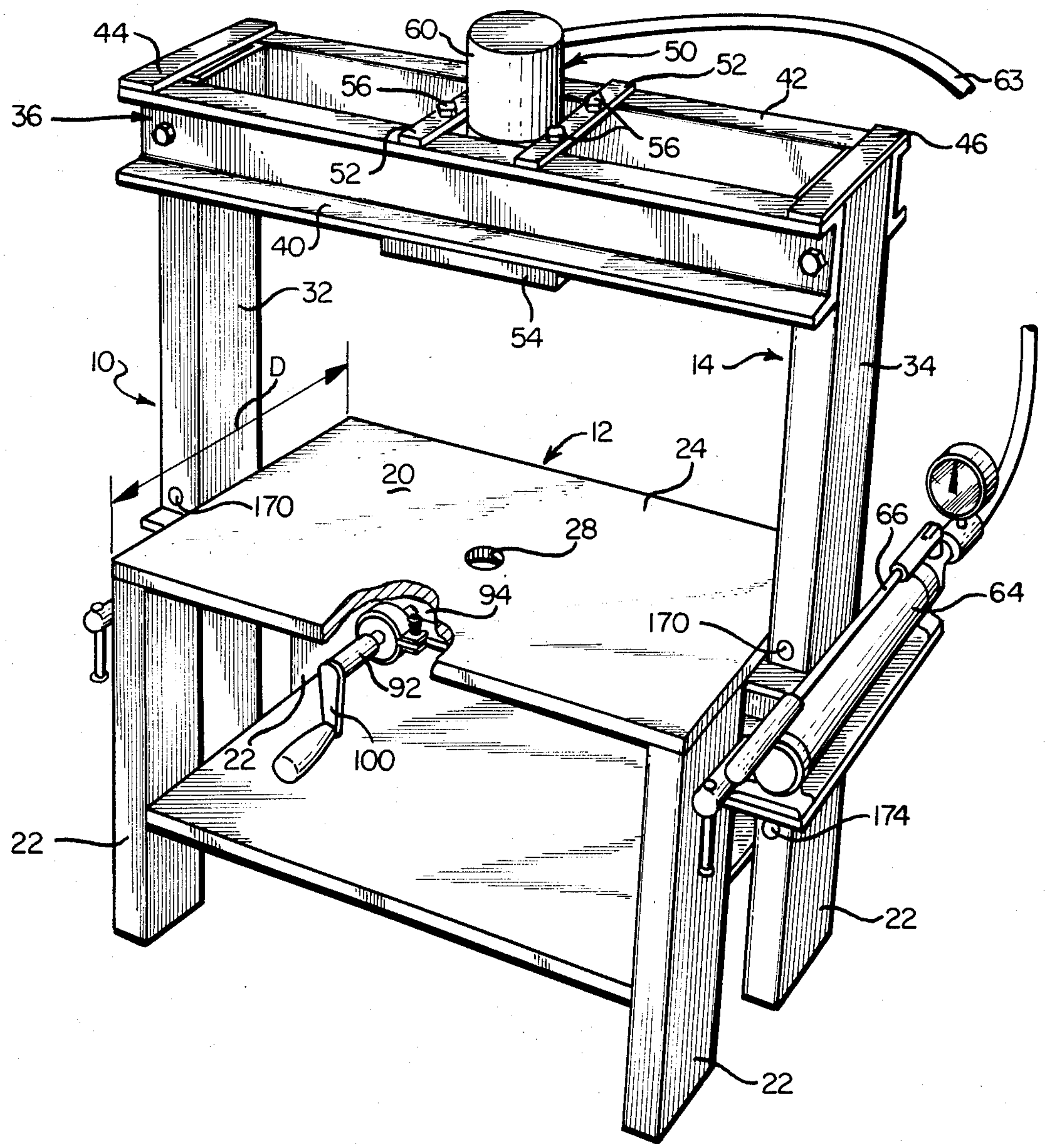
FIG. 1 is a perspective view showing the novel shop press in its general aspect.
Figure 2:
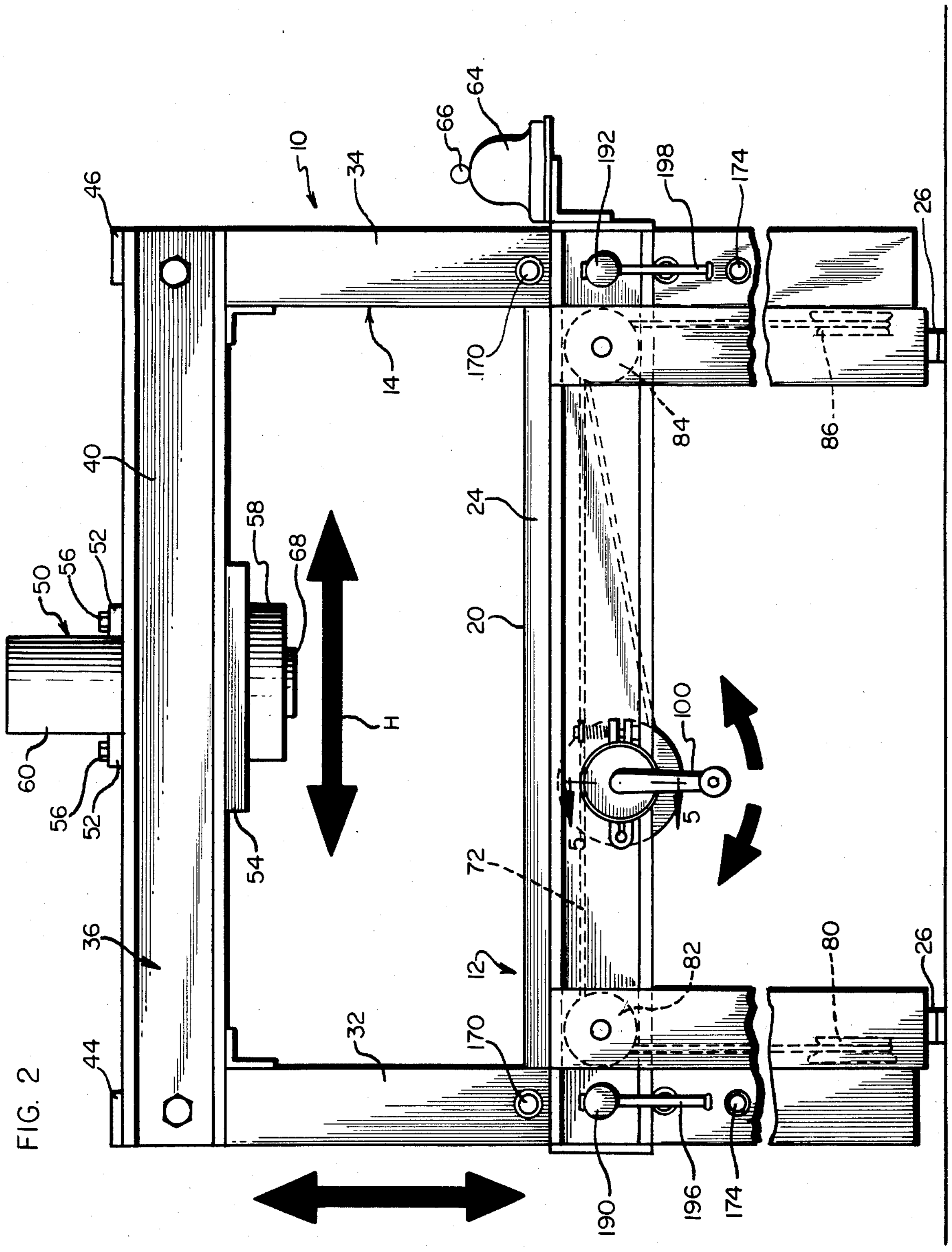
FIG. 2 is a front elevational view of the novel shop press shown in FIG. 1.
Figure 3:
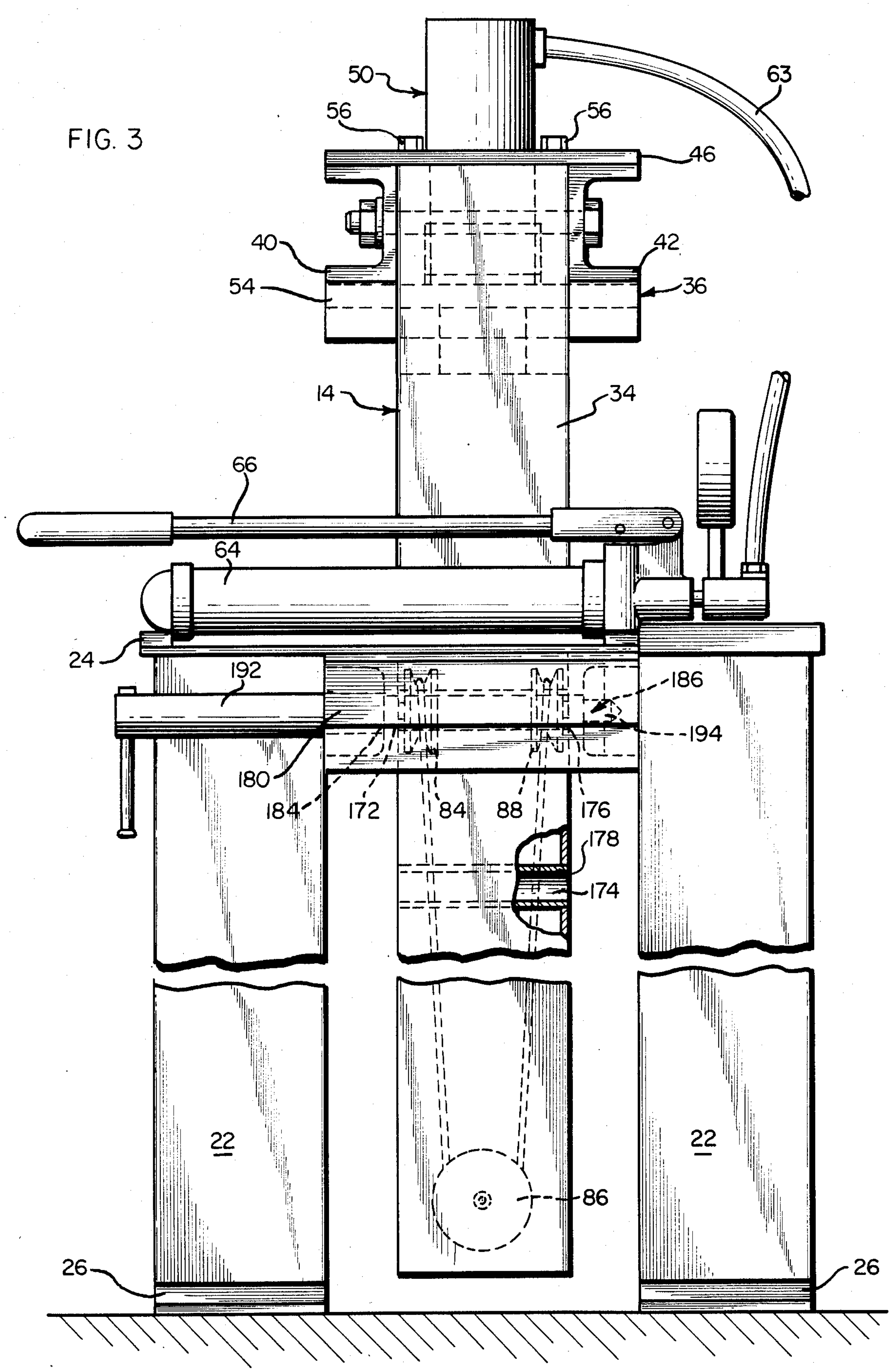
FIG. 3 is a side elevational view of the novel shop press shown in FIGS. 1 and 2.

Turning more specifically to FIGS. 1–3 of the drawings, there is shown a novel shop press 10 embodying the present invention. In general, this shop press 10 can be considered to include a fixed table structure 12 capable of supporting a workpiece (not shown) and a ram assembly 14 which is movable vertically (that is, up and away from or down and toward) the table assembly 12.

In accordance with one aspect of the invention, this fixed table 12 has a relatively large depth or horizontal extent D, as particularly shown in FIGS. 1 and 3. By providing the table 12 with this great depth, any usual workpiece can be securely supported no matter how the workpiece is shaped, and no matter how it is placed on the table surface 20.

It will also be noted that the deep table 12 is designed to be located at a fixed height. To this end, four rigid corner legs 22 of fixed vertical extent or height are supportively affixed under the table top 24. Leveling devices 26 of known design can be provided so as to orient the top surface 20 in a perfectly horizontal position, no matter what the slope or orientation of the shop floor. If desired, a drop-out hole 28 can be provided in the table top 24 to accommodate the extrusion of pins or other parts being disassemled by the shop brake. The legs 22 are positioned at the corners of the table 12 and thus provide a wide, stable base for the table, which wide base resists tipping and provides a high degree of stability.

The ram assembly 14 includes, in general, two opposed vertically movable ram support legs 32, 34 and a horizontally disposed ram top assembly or head 36. For rigidity, this horizontal head assembly 36 includes opposed structural members such as channel irons 40, 42 and can include top plates 44, 46 atop the legs 32 and 34.

Mounted for adjustable horizontal movement upon this ram device 14 is a head 50 which here includes opposed clamp plates 52 and 54 secured together by elongated fasteners such as bolts 56. A threaded collar device 58 is located below the bottom plate 54, and into this threaded collar 58, a hydraulic cylinder or other fluid power drive device 60 can be mounted. Thus, the position of the fluid power device 60 can be adjusted horizontally relative to table 12 as needed.

Pressurized fluid is supplied to and released from the hydraulic cylinder 60 by a hose line 63 and a pump device such as a hand cylinder 64, which can be operated by an actuator handle 66. This mechanism permits a cylinder rod 68 (FIG. 2) to be extended toward the table surface 20 and any workpiece carried thereon. By appropriately actuating valves (not shown) in the fluid power system, the hand pump 64 can be worked so as to return the cylinder rod 68 into the cylinder 60 and withdrawn from the workpiece. The hand cylinder can have a rating of, say, 25 tons to provide adequate working pressures in the cylinder 60.

The collar 58 can be removed from the ram asembly 50, and another collar substituted in its place. In this way, a fluid power cylinder having a different size, or rod stroke, or different capacity can be substituted for the original fluid power cylinder 60 shown here. Thus, piston rods of differing sizes or shapes, and brake cylinders of different capacities can be quickly and easily installed on and removed from the shop brake mechansim 10. In this way, the shop brake tool can be quickly and conveniently adapted for use in a wide variety of tasks acquiring a wide variety of machine capacities.

By loosening the fastener bolts 56, the entire head assembly 50 can be slid horizontally to the left or right along the ram channels 40, 42, as suggested by the arrow H. This arrangement permits the head means 50 to be precisely located for work on any desired portion of the workpiece. When the fluid power head assembly 50 has been located in the appropriate position, the bolts 56 can be re-tightened so as to secure the head 50 in the desired position upon the ram 14. Thus, a highly versatile shop press is provided.

Figure 4:
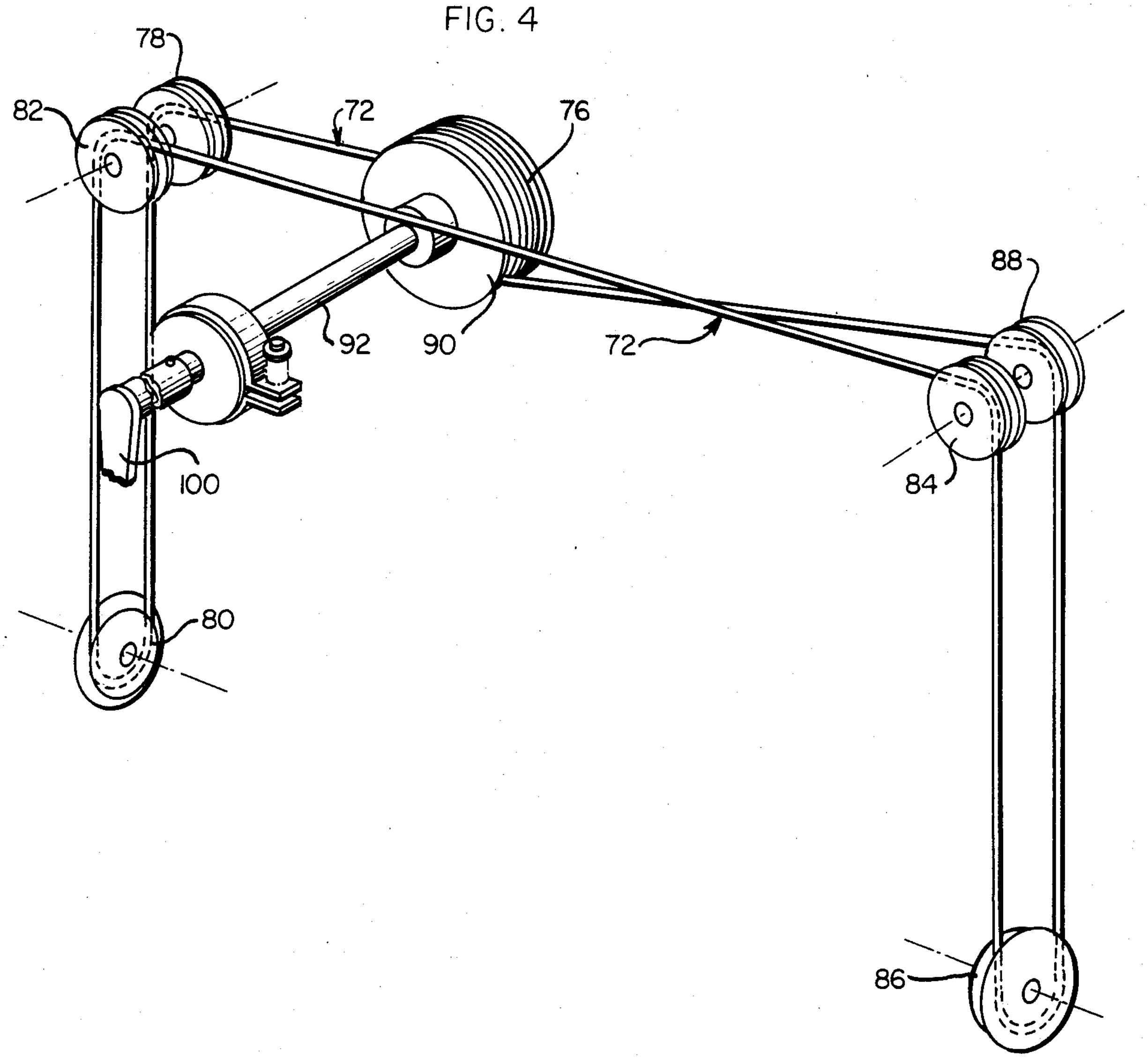
FIG. 4 is a fragmentary perspective view showing in detail the system by which the shop press ram can be raised and lowered.

In accordance with another aspect of the invention, the ram 14 may be moved in an upward direction so as to locate the head 50 and fluid power cylinder 60 relatively far from the table 12, or the ram 14 can be moved relatively downwardly so as to bring the head 50 and fluid power cylinder 60 closer to the table 12. To this end, a winch and cable system 70 is provided as shown in FIGS. 2, 3 and 4. Here, a cable 72 is secured at one end 74 to a rotatable drum 76. The cable 72 is then routed over a first pulley mechanism 78 mounted at a corner of the table, and down over an idler pulley 80 mounted at the bottom of the ram leg 32. The cable 72 is then directed upwardly and over a second pulley 82 mounted just in front of the first pulley 78. The cable then runs across the table to yet another pulley 84, and down to a second idler pulley 86 mounted at the bottom of the opposite ram leg 34. At this second idler pulley 86 the cable again changes direction and is routed back upwardly to a final table pulley 88. The cable is then directed to and wound upon a second cable coil drum 90. The drums 90 and 76 turn together, because they are each keyed to a shaft 92 journaled to a midpoint 94 of the table 12, as illustrated particularly in FIGS. 1 and 2. By so arranging the cable 72, a mechanical advantage of 2 is provided, thereby, requiring relatively small force to be applied to the system in order to raise and lower the ram 14.

As can be envisioned from FIG. 4, movement of the cable drums 76 and 90 can be caused by turning a crank handle 100. As the cable 72 is wound upon the drums 76 and 90, the cable movement acts to draw upwardly the idler pulleys 80, 86. Because the pulleys 80, 86 are journaled upon the respective ram support legs 32, 34, the entire ram assembly 14 is moved in an upward direction, and the head 36 is carried up and away from the table 24.

When the crank handle 100 is turned in the opposite direction and the cable 72 is unwound from the cable drums 76 and 90, the entire ram assembly 14 is lowered by the force of gravity. This movement drops the head 50 toward the table 12. In this way, the head mechanism 50 is brought closer to the work table 12 and any workpiece carried thereon.

Figure 6:
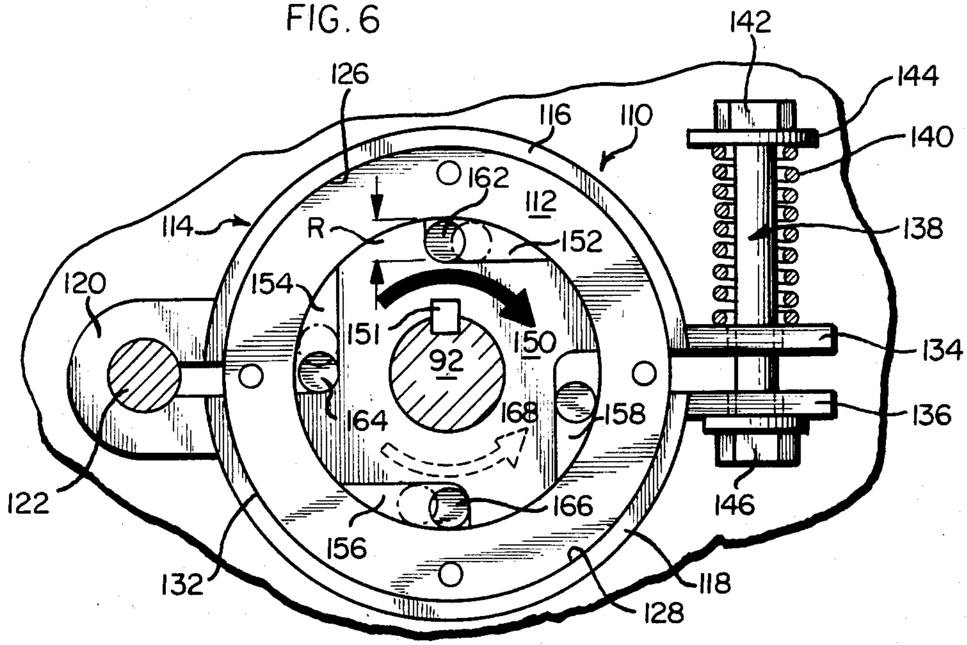
FIG. 6 is a front elevational view of the shop press winch and brake mechanism, the mechanism cover being removed for clarity.
Figure 5:
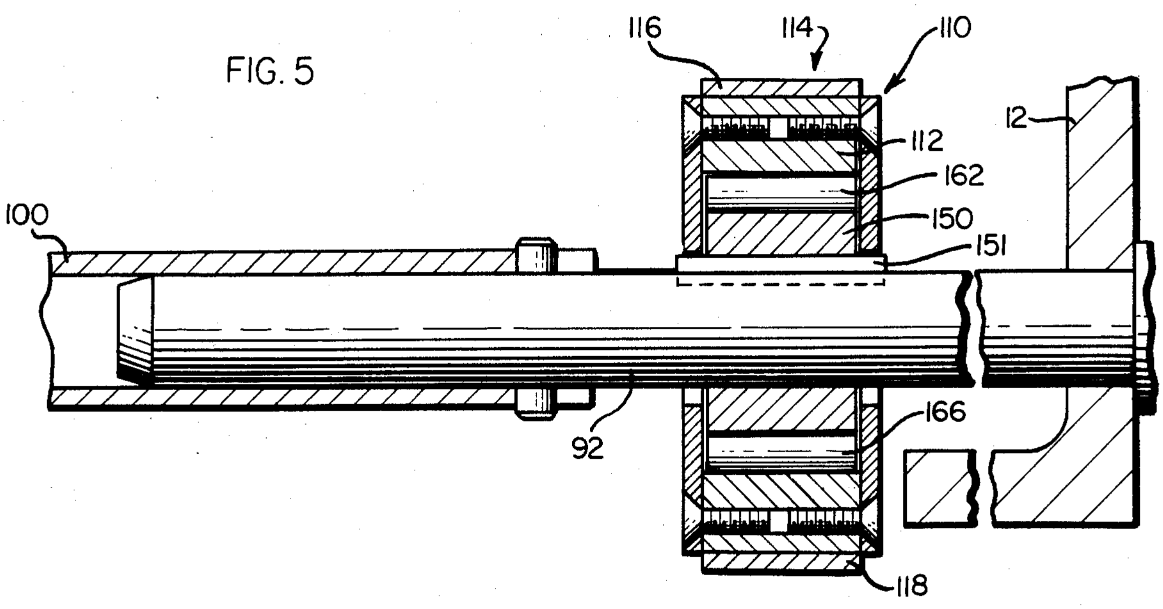
FIG. 5 is a fragmentary sectional view, taken substantially in the plane of line 5—5 in FIG. 2, showing in further detail portions of the shop press winch and brake mechanism.

It will be understood that the ram assembly 14 is of relatively considerable weight. It is accordingly important that the ram assembly be raised with as little effort as possible, and that the ram assembly 14 not be dropped in an uncontrolled manner when it is desired to lower the ram assembly. To this end, a slip clutch or brake unit 110, shown particularly in FIGS. 5 and 6, is provided and mounted to the shaft 92 which initiates the winding and unwinding of the cable 72 and consequently raising and lowering the ram assembly 14. As will be explained, the slip clutch and brake 110 permits free rotation of shaft 92 to raise the ram assembly 14. Upon lowering the brake unit 110 controls rotation of shaft 92, so that the ram 14 can be lowered in a controlled manner.

The slip clutch and brake assembly 110 includes an outer annular ring member 112 which is carried within a clamp-type strap brake member 114. The strap brake member 114 includes upper and lower brake strap members 116, 118 which are interconnected at one side by a support member 120; for convenience in mounting, this connector member 120 can be attached to a threaded or other suitable fastener such as a convenient bolt 122. The upper and lower brake members 116, 118 are formed of suitable spring steel or other metallic material, in which case they are preferably provided with burnished surfaces 126, 128, respectively. These burnished surfaces 126, 128 are adapted to closely match and frictionally engage an outer surface 132 provided on the ring member 112.

At a side opposite the connector member 120, these brake strap members 116, 118 terminate in generally opposed ears 134, 136, through which a fastener such as a bolt 138 can be attached. As illustrated here, a compression spring member 140 is interposed between a head 142 and washer 144 combination on one end of the bolt 138, and the ear 134 located at the other end. The bolt is retained in the illustrated position by a nut 146. In this way, the compression spring 140 is maintained in at least a slightly compressed condition under normal operating circumstances. By tightening the nut 146, the effective length of the bolt 138 can be increased or decreased, thereby correspondingly decreasing or increasing the biasing force applied to the ears 134, 136 by the spring 140. In this way, the frictional binding action of the associated brake members 116, 118 can be correspondingly decreased or increased, and, consequently, the braking action applied to the ring member 112 can be adjusted.

Within the ring member 112 is located a generally cylindrical clutch member 150, which is affixed to the shaft 92 by a key 151 or other suitable device. One or more generally L-shaped cut-out notches or pockets are formed in this ring member. Here, four such cut-out pockets 152, 154, 156, 158 are formed, and they are located at regularly angularly spaced-apart locations, as illustrated in FIG. 6. With continued reference to FIG. 6, a cylindrical pin member may be disposed in each said notch or cut-out, discussion will follow, however, with regard to cut-out 152 it being understood that operation of the pins in the remaining cut-outs being essentially the same. A generally cylindrical pin 162 is carried in the L-shaped cut-out 152. This pin 162 is formed so as to have a diameter just slightly less than the radial extent R of the L-shaped cut-out pocket 152.

When the shaft 102 and ring member 150 are rotated clockwise in the direction shown by the solid arrow in FIG. 6, the pin 162 does not forcefully engage the outer ring member 112. Consequently, the clutch member 150 and shaft 102 rotate in a clockwise direction without substantial impediment being offered by the brake mechanism described above. No mechanical impediment is thus afforded as the ram assembly 14 is urged upwardly into a raised condition.

When, however, it is desired to lower the ram assembly 14, the shaft 102 and attached clutch member 150 are rotated in a counter-clockwise direction as indicated by the dotted arrow in FIG. 6. Under these conditions, the pin 162 moves into the position shown in dotted lines, and acts as a wedge-type interengagement member between the clutch member 150 and the surrounding ring member 112. Under these circumstances, the clutch member 150 and ring member 112 rotate together as a unit, and their rotational movement is impeded by the surrounding brake strap elements 116 and 118. In this way, a braking effect is provided as the ram 14 is lowered from a raised position to a lowered position. This frictional or braking effect permits the ram to be lowered with but little opposing effort by the machine tool user, and most importantly, lowered in a controlled manner.

It will be understood that a plurality of pins can be provided here. For example, pins 162, 164, 166, and 168 can be provided in each of the correspondingly L-shaped cut-out pockets 152, 154, 156, and 158. In this way, a uniform application of torque can be provided from the clutch member 150 to the surrounding ring member 112. Relatively greater braking and ram-lowering forces can, accordingly, be accommodated. In the interests of economy, however, only one pin 162 need be provided if the ram assembly 14 is of sufficiently light weight. When the ram assembly 14 has been raised or lowered to the approximately desired position, it is helpful to secure the ram assembly in that desired position against the force of gravity, and against the relatively great forces which will be applied during operation of the fluid power device 60 upon the workpiece. To this end, the ram legs 32, 34 are each provided with a series of through bores or holes 170, 172, 174, as especially suggested in FIGS. 2 and 3. Here, these holes are additionally defined by hollow tubes 176, 178, as suggested in FIG. 3.

The table itself is provided with flanges or outrider mechanisms 180, 182, which are provided with mating holes 184, 186, as also indicated especially in FIG. 3. Large-diameter side pins 190, 192 can be passed through these outrigger holes and the registered holes in the ram assembly 14. For additional security, these side pins 190, 192 can be provided with male threads 194 for engagement on a far side of the outrigger mechanism. When the side pins 192 are passed entirely through each leg of the ram assembly and the hole-defining tubes, the pins can then be secured in place by threaded interengagement with the table outrider mechanism. Thus secured, the side pins 190, 192 are discouraged from working loose. Since the side pins 190, 192 cannot work loose, the ram assembly 14 is secured against inadvertent droppage.

Operation of the shop press is not difficult. The machine operator removes the side pins 190, 192 by turning the cross-pins 196, 198 so as to unscrew them from the table. After the pins 190, 192 are removed, the operator turns the crank 100 to lower or raise the ram assembly 14. When the ram assembly 14 has been positioned, the side pins 190, 192 are reinstalled through the appropriate holes 170, 172, 174. If necessary, an alternate-sized fluid power cylinder is installed by using the collar 58, and the head 50 is located and secured in a desired horizontal position. The cylinder 50 is then operated by using the handle 66 of the fluid power pump 64.

The invention is claimed as follows:

1. A shop press comprising, in combination; a table including a work surface capable of supporting a workpiece; a ram assembly for supporting a hydraulic actuator, and said ram assembly being mounted for vertical movement with respect to said table, said ram assembly including a horizontal head defined by a pair of spaced structural members with a hydraulic actuator support head being adjustably mounted between said structural members for movement along the length of said horizontal head, a pair of elongate vertically disposed ram support legs, one being positioned on each side of the table, with said support legs being attached to opposite ends of said horizontal head at the upper ends thereof and extending past the table work surface a sufficient distance such that upon lowering of the ram assembly the legs will engage a floor upon which the table is mounted before the horizontal head will engage the work surface of the table; guide means on each side of said table embracing said ram support legs while permitting vertical movement of the entire ram assembly; and elevating means for said ram assembly carried by said table and said vertically disposed ram support legs, such that such elevating means is concealed within the confines of said table and said ram support legs and is disposed below the working surfce of said table, said elevating means including a drum member rotatably mounted below the work surface of said table, a first set of pulleys, one said pulley carried by the lower portion of each of said ram support legs, a second set of pulleys mounted to said table and disposed below the work surface of said table, and cable means affixed to said drum means and engaged over said pulleys such that the drum member may be operated to wind and unwind the cable thereon therby raising and lowering said ram assembly, and one-way brake means operably connected with said drum member for inhibiting cable unwinding motion of the drum which would lower the ram assembly, but freely permitting cable winding motion of said drum to raise said ram assembly.

2. A shop press according to claim 1 further including means for rigidly securing the movable ram assembly in any one of a plurality of positions above the workpiece-carrying table.

3. A shop press according to claim 1 wherein said table has a greater horizontal depth dimension than said ram means.

4. A shop press according to claim 1 wherein said one-way brake means includes friction brake means and one-way clutch means for permitting the friction brake means to be turned freely in one rotational direction, but inhibiting motion when said one-way brake means is turned in the opposite rotational direction.

5. A shop press according to claim 1 further including fluid power head means mounted on said ram assembly for engaging the workpiece carried by the table.

6. A shop press according to claim 5 further including fluid power mounting means for permitting said fluid power means to be removed from said ram and replaced by fluid power means of differing capacity.

7. A shop press according to claim 1 wherein said one-way brake means includes a ring member, friction brake means engaging the ring member to inhibit ring member rotation, a clutch member mounted at least partly within the ring member, and means connecting the ring member and clutch member for co-rotation against the braking of the friction brake means when the clutch member is turned in one direction, but disconnecting the ring member and clutch member to permit the clutch member to turn freely in the opposite direction.

8. A shop press according to claim 7 wherein said one-way brake means includes a pin means disposed in a cut-out pocket formed in said clutch member.

* * * * *